United States Patent Office 3,787,527
Patented Jan. 22, 1974

3,787,527
PROCESS FOR THE SETTING OF UNSATURATED POLYESTER RESINS
Heinz Meyer, Munich, Dieter Schmid, Pullach, near Munich, Hans Schwarzer, Krailling, and Hans Joachim Twittenhoff, Strasslach, Germany, assignors to Electrochemische Werke Munich AG, Hollriegelskreut, near Munich, Germany
No Drawing. Original application June 2, 1969, Ser. No. 829,766, now abandoned. Divided and this application Oct. 14, 1971, Ser. No. 189,408
Int. Cl. C08f 21/02
U.S. Cl. 260—861    7 Claims

ABSTRACT OF THE DISCLOSURE

Process for setting unsaturated polyester resins which comprises contacting such a polyester resin with a mixture of a perester and a tertiary hydroperoxide as setting catalyst, the weight ratio of the perester to said tertiary hydroperoxide being from 90:10 to 10:90.

---

This application is a divisional application of application Ser. No. 829,766, filed June 2, 1969, now abandoned.

The invention relates to a process for setting unsaturated polyester resins and is directed particularly to improvements in the art of setting unsaturated polyester resins. Unsaturated polyester resins (UP) in the meaning of the invention are mixtures of one or more unsaturated polyesters with one or more unsaturated compounds which can react with one another with cross-linking.

Unsaturated polyester resins are usually set by heating in the presence of peroxidic initiators. Setting can also be carried out at lower temperatures, for example, at room temperature, if the reaction is conducted in the presence of an accelerator, particularly a heavy metal salt or, if desired, a tertiary aromatic amine.

The initiators which are conventionally used for this purpose include for example, peresters, diacyl peroxides, per ketals, ketone peroxides and hydroperoxides. Salts of cobalt, vanadium and manganese are instances of preferable metal salts having an accelerating action. It is also known that vanadium accelerators with salts or derivatives of phosphorous acid can be used for this purpose.

Setting with hydroperoxides alone, at elevated temperature without an accelerator, or at normal temperatures using a conventional metal accelerator, takes place in an unsatisfactory manner. This is because, although a rapid setting of the resin takes place, the complete hardening is accomplished only very slowly. Hydroperoxides, therefore, are poorly suited for the normal working of unsaturated polyesters. Furthermore, they often produce considerable discoloration or after-discoloration in the finished products.

The use of peresters has also not proved satisfactory in all cases. This is true both of pure and of commercial products, which normally contain about 1 to 2% free hydroperoxide derived from the process of their manufacture.

It is an object of the present invention to provide an improved process for the setting of unsaturated polyester resins.

It is another object of the present invention to provide a more rapid and reliable process for setting unsaturated polyester resins.

Still another object of the invention is to provide setting agents for setting unsaturated polyester resins which are extremely efficient at low and moderate temperatures.

A further object of the invention is set polyester resin products which are free of discolorations, and which have excellent weathering properties.

These and other objects and advantages of the invention will be apparent from the following description.

In accordance with the invention, it has now surprisingly been found that peresters in combination with tertiary hydroperoxides in certain ratios offers important advantages in the setting of unsaturated polyester resins. These results are not possible with the use of either of the components alone.

The process according to the invention for the complete setting of unsaturated polyester resins by the addition of peroxidic catalysts consists, therefore, in the use of mixture ratio of 90:10 to 10:90 as setting catalysts. Preferably, the ratio of perester to tertiary hydroperoxide is between 30:70 and 50:50 parts by weight.

The combinations according to the invention can be used in the setting process together with the conventional accelerators. Particularly suitable are vanadium accelerators for so-called cold setting at normal temperatures, and cobalt accelerators for setting at medium temperatures.

The unsaturated polyesters which can be set according to the invention are obtained by the esterification of unsaturated dicarboxylic acids or their anhydrides or functional derivatives with saturated or unsaturated polyols or functional derivatives thereof. Examples of suitable acids which can be used alone or in mixture with one another are maleic acid, fumaric acid, or itaconic acid and the like. They can be partially replaced by one or more saturated dicarboxylic acids, as for example adipic or succinic acid, and by aromatic dicarboxylic acids, which may also be present together in the mixture, as for example phthalic acid, tetrahydrophthalic acid, or anhydrides thereof.

Examples of suitable polyols, which can also be used either alone or in mixture with one another, are ethylene glycol, diethylene glycol (2,2-dihydroxydiethylether), triethylene glycol, ethyleneglycol-bis-(2-hydroxyethylether), propanediol-1,2, butanediol-1,3, 2,2-dimethylpropanediol-1,3, butene-(2)-diol-1,4 and others.

The acids as well as the alcohols can also be substituted, as for example, by halogen atoms. Examples of suitable halogenated acids include, tetrachlorophthalic acid, 1,4,5,6,7,7-hexachlorobicyclo-(2,2,1)-heptene-(5)-2,3-dicarboxylic acid and the like, as well as their anhydrides.

In addition to the components mentioned above for the production of unsaturated polyesters, other polyesters are, of course, also suitable, which contain ester groups and unsaturated groups derived from polyvalent carboxylic acids and polyvalent alcohols.

Peresters within the framework of the invention can be compounds having the formula:

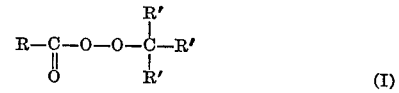

(I)

in which the groups R and R', which can be the same or different, are substituted, unsubstituted, saturated and unsaturated alkyl, cycloalkyl, aralkyl or aryl. Examples of peresters within the scope of Formula I are peracetate, perpropionate, perlaurinate, peroctoate, per-3,5,5-trimethylhexanoate, per-2-ethylhexanoate, perbenzoate, per-2,4-dichlorobenzoate, perphenoxyacetate, per-2,4-dichlorophenoxyacetate and per-4-nitrophenoxyacetate.

In the above Formula I, the groups R' can also contain additional hydroxyl groups, so that peresters having the formula:

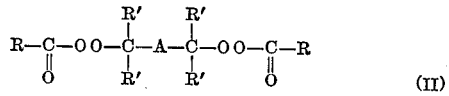

(II)

can be used, in which A represents substituted, unsubstituted, saturated or unsaturated alkyl, cycloalkyl, aralkyl or aryl. Examples of compounds of Formula II are 2,5-dimethylhexane-2,5-bis-perbenzoate, 2,5 - dimethylhexane-2,5-bis-per-3,5,5-trimethylhexanoate, 2,5-dimethylhexane-2,5-bis-per-2-ethylhexanoate, 2,5-dimethylhexine-2,5-bis-peracetate and 2,5-dimethylhexine-2,5-bis-perbenzoate.

The R groups can also be polyfunctional, so that peresters having the formula:

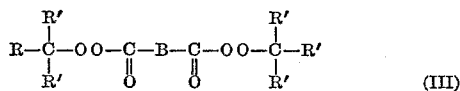

(III)

can be used, wherein B has the same significance as A in Formula II. Examples of compounds of Formula III are bis-permaleinate, bis-peradipate, bis-perfumarate, bis-perphthalate, etc.

The groups A and B can also designate a direct carbon-carbon bond.

Suitable hydroperoxides for use in the invention are compounds of the formula:

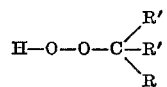

wherein the groups R', which can be the same or different, have the same significance as set out above.

The surprising advantages of the process of the invention which comprises using combinations of peresters with tertiary hydroperoxides for the setting of unsaturated polyester resins consist substantially in a considerably more rapid setting than when either of the two individual components is used (see Table I infra), very fast mold cure (the period after which a piece can be removed from the mold without harm, see Table I infra), very complete hardening as determined, for example, by finding the dielectric loss factor tan δ (see Table III, infra), and a surprisingly good weather resistance by the hardened pieces, even in the case of the so-called self-quenching polyester resins which are known to have a very strong tendency toward discoloration (see Table IV infra).

As the use of hydroperoxides results only in poor results as concerns the above properties, it was especially surprising that by their addition to peresters, which are quite suitable for use by themselves, the results are not impaired but that they are considerably improved.

The shelf-life of unsaturated polyester resins after the addition of the per compound combination according to the invention can be very greatly extended by commonly available inhibitors. The hardening time with accelerator and without accelerator is not substantially affected by the presence of inhibitors. This fact is advantageous in the working of the polyesters with the two-component systems (see Table II, infra).

The conventional fillers do not have any substantial effect on the setting time, so that the peroxide combinations used according to the invention are also suitable for the manufacture of storageable molding compounds and pre-impregnated materials.

The following examples are given in order to further illustrate the invention, the same are, however, not to be construed in any way as limiting the scope thereof. The abbreviations used in the examples and tables have the following meanings:

Abbreviations used for designating unsaturated polyester resins:

UP=unsaturated polyester resin
"Resin 1"=a condensation product of
    1.5 mols maleic acid anhydride
    1.5 mols phthalic acid anhydride
    3.3 mols propanediol-1,3 stabilized with 0.13% hydroquinone and dissolved in 50 wt.-parts of monostyrene per 100 wt.-parts of unsaturated polyester.
"Resin 2"=a condensation product of
    1.2 mols maleic acid anhydride
    1.8 mols phthalic acid anhydride
    3.3 mols ethylene glycol stabilized with 0.01% hydroquinone, and dissolved in 30 wt.-parts of monostyrene per 70 wt.-parts of unsaturated polyester.
"Self-quenching UP resin"=a condensation product of
    1 mol maleic acid anhydride
    2 mols HET acid anhydride (anhydride of 1,4,5,6,7,7 - hexachlorobicyclo (2,2,1) - heptene(5)-2,3-dicarboxylic acid)
    3.3 mols propanediol-1,2 stabilized with 0.015% hydroquinone, dissolved in 50 wt.-parts of monostyrene per 100 wt.-parts unsaturated polyester.
    Total chlorine content in the self-quenching UP resin: 26.5%

Abbreviations used for designating peroxides (peresters plus hydroperoxides):

I=tert.-butylperoctoate (free of hydroperoxide)
II=tert.-butylperisononanate (free of hydroperoxide)
III=tert.-butylperbenzoate (free of hydroperoxide)
IV=2,5-dimethylhexane-2,5-bis-perisononanate
V=tert.-butylhydroperoxide
VI=2,5-dimethylhexane-2,5-bis-hydroperoxide Abbreviations used for designating accelerators:

A=vanadium-p-toluenesulfonate in a mixture of xylene and isopropyl alcohol with excess p-toluenesulfonic acid; 1% metal content.
B=same, with 0.4% metal content and 1% tert.-butylcatechol
C=solution of vanadium-p-toluenesulfonate in isopropyl alcohol, with 0.4% metal content and 40% dibutylhydrogenphosphite
D=solution of vanadium-p-toluenesulfonate in isopropyl alcohol with 0.4% metal content and 25% dibutylhydrogenphosphite
E=solution of vanadium-p-toluenesulfonate in isopropyl alcohol with 0.4% metal content and 25% dibutylhydrogenphosphite and excess p-toluenesulfonic acid
F=solution of vanadium-p-toluenesulfonate in isopropyl alcohol with 0.4% metal content and excess p-toluenesulfonic acid
G=solution of vanadium-p-toluenesulfonate in ethanol with 0.4% metal content, 5% mercaptosuccinic acid and excess p-toluenesulfonic acid
H=vanadium-p-toluenesulfonate in a mixture of xylene and isopropyl alcohol; 1% metal content
I=solution of cobalt octoate with 1% metal content in styrene

EXAMPLE 1

100 g. of Resin 1 were stirred in a beaker together with the quantities of peroxide and accelerator which have been set out in Table I. About 50 g. of the mixture were used for the determination of the mold cure time $T_E$. The setting time $T_{gel}$ is the time period when the beaker, is rotated at a slant for the first streaks to become visible. After this period, the resin is no longer castable or workable in practice.

To measure the mold cure time, glass-fiber reinforced laminates 2 mm. thick, containing 600 g. of glass mat per square meter, were rolled out between two sheets of polyethylene film known as Hostaphan (registered trademark of the firm of Kalle of Wiesbaden, Germany). The mold cure time $T_E$ is the time required for the laminate to reach a Shore D hardness of about 70 (average of 10 measurements). At this hardness a casting can be removed from the casting mold without crazing at the glass fibers.

All measurements were carried out in an air-conditioned room at 20° C. and 60% relative atmospheric humidity. The results which were obtained are set out in Table I.

TABLE I.—COLD HARDENING OF UP, RESIN 1

| Peroxide | Mixture ratio | Amount of mixture, percent | Accelerator | Amount, percent | $T_{gel}$ (min.) | $T_E$ (min.) |
|---|---|---|---|---|---|---|
| I | 100:0 | 1 | A | 0.3 | 55 | 110 |
|  | 90:10 | 1 | A | 0.3 | 7 | 25 |
| + | 80:20 | 1 | A | 0.3 | 5 | 23 |
|  | 50:50 | 1 | A | 0.3 | 4 | 22 |
| V | 10:90 | 1 | A | 0.3 | 6 | 62 |
|  | 0:100 | 1 | A | 0.3 | 7 | 100 |
| I | 100:0 | 2 | A | 0.3 | 35 | 70 |
|  | 80:20 | 2 | A | 0.3 | 5 | 24 |
| + | 50:50 | 2 | A | 0.3 | 5 | 55 |
| V | 0:100 | 2 | A | 0.3 | 15 | 300 |
| I | 100:0 | 1 | A | 0.5 | 28 | 68 |
|  | 80:20 | 1 | A | 0.5 | 5 | 15 |
| + | 50:50 | 1 | A | 0.5 | 3 | 14 |
|  | 10:90 | 1 | A | 0.5 | 4 | 24 |
| V | 0:100 | 1 | A | 0.5 | 5 | 40 |
| I | 100:0 | 2 | A | 0.5 | 17 | 42 |
|  | 90:10 | 2 | A | 0.5 | 7 | 29 |
| + | 80:20 | 2 | A | 0.5 | 3 | 15 |
|  | 50:50 | 2 | A | 0.5 | 3 | 24 |
| V | 10:90 | 2 | A | 0.5 | 9 | 80 |
|  | 0:100 | 2 | A | 0.5 | 11 | 110 |
| I | 100:0 | 2 | A | 1 | 14 | 35 |
|  | 80:20 | 2 | A | 1 | 4 | 18 |
| + | 50:50 | 2 | A | 1 | 3 | 18 |
| V | 0:100 | 2 | A | 1 | 10 | 45 |
| II | 100:0 | 1 | A | 0.3 | 50 | 126 |
|  | 90:10 | 1 | A | 0.3 | 8 | 39 |
| + | 80:20 | 1 | A | 0.3 | 5 | 23 |
|  | 50:50 | 1 | A | 0.3 | 4 | 25 |
| V | 10:90 | 1 | A | 0.3 | 7 | 68 |
|  | 0:100 | 1 | A | 0.3 | 7 | 100 |
| II | 100:0 | 1 | A | 0.5 | 30 | 60 |
|  | 90:10 | 1 | A | 0.5 | 7 | 15 |
| + | 80:20 | 1 | A | 0.5 | 4 | 12 |
|  | 50:50 | 1 | A | 0.5 | 4 | 12 |
| V | 10:90 | 1 | A | 0.5 | 4 | 24 |
|  | 0:100 | 1 | A | 0.5 | 4 | 40 |
| II | 100:0 | 2 | A | 1 | 11 | 37 |
|  | 80:20 | 2 | A | 1 | 3 | 16 |
| + | 50:50 | 2 | A | 1 | 3 | 10 |
|  | 10:90 | 2 | A | 1 | 8 | 37 |
| V | 0:100 | 2 | A | 1 | 11 | 52 |
| I | 100:0 | 1 | B | 0.5 | 150 | >360 |
|  | 80:20 | 1 | B | 0.5 | 10 | 55 |
| + | 50:50 | 1 | B | 0.5 | 8 | 70 |
|  | 10:90 | 1 | B | 0.5 | 20 | 300 |
| V | 0:100 | 1 | B | 0.5 | 43 | >360 |
| II | 100:0 | 1 | B | 0.5 | 160 | >360 |
|  | 80:20 | 1 | B | 0.5 | 10 | 90 |
| + | 50:50 | 1 | B | 0.5 | 9 | 43 |
|  | 10:90 | 1 | B | 0.5 | 35 | 330 |
| V | 0:100 | 1 | B | 0.5 | 43 | >360 |
| II | 100:0 | 2 | C | 0.5 | 114 | 300 |
|  | 90:10 | 2 | C | 0.5 | 34 | 70 |
| + | 80:20 | 2 | C | 0.5 | 15 | 38 |
|  | 50:50 | 2 | C | 0.5 | 13 | 40 |
| V | 10:90 | 2 | C | 0.5 | 18 | 93 |
|  | 0:100 | 2 | C | 0.5 | 19 | 105 |
| II | 100:0 | 1 | H | 0.3 | 12 | >400 |
|  | 80:20 | 1 | H | 0.3 | 3 | 120 |
| + | 50:50 | 1 | H | 0.3 | 2'30" | 90 |
| V | 0:100 | 1 | H | 0.3 | 4 | 180 |
| I | 100:0 | 1 | H | 0.3 | 90 | >400 |
|  | 80:20 | 1 | H | 0.3 | 4 | 110 |
| + | 50:50 | 1 | H | 0.3 | 2 | 80 |
| V | 0:100 | 1 | H | 0.3 | 5 | 200 |

EXAMPLE 2

In order to determine the shelf life of a catalyzed UP resin mixture, the quantity of peroxide as set out in Table II was added to 50 g. of Resin 1, and after thorough mixing the mixture was stored in the dark in a closed rolling flask, anr examined from time to time for streaks. The shelf life has been ended when the first streaks appear after the closed flask is inverted. The storage temperature was 20° C. The setting procedure was carried out as described in Example 1.

The results obtained have been set out in Table II.

TABLE II.—INHIBITOR ACTION
1% II + V (50:50 mixture)
Inhibitor: 2,6-di-tert.-butyl-p-cresol

| Amount of inhibitor added, percent | Shelf life of UP Resin 1 with peroxide added | Accelerator | Setting at 20°C. | |
|---|---|---|---|---|
| | | | Setting time, min. | Mold cure time, min. |
| | 9 days | 0.5% A | 4 | 15 |
| | | 1% C | 7 | 38 |
| 0.1 | 65 days | 0.5% A | 10 | 24 |
| | | 1% C | 13 | 64 |

From the figures in Table II, it can be seen that the effect of the inhibitor on setting using the peroxide combination according to the invention is particularly favorable, because the shelf life of the catalyzed resin mixture is very greatly extended, although the cold-setting time is scarcely affected.

Since the shelf life of vanadium-accelerated resins can be very greatly extended by inhibitors, the fact that the inhibitor has so very little effect on the cold-setting time achieved with the combination according to the invention constitutes another considerable advantage.

EXAMPLE 3

In order to measure the degree to which the complete hardening is possible using the combination according to the invention, sheets 4 mm. thick were cast between glass plates at 20° C. using Resins 1 and 2 without glass fiber reinforcement. The plates were removed from the molds in about 20 hours. The dielectric loss factor at 800 Hz. was then measured on these plates at 20° C. and 60° relative humidity. Another measurement was carried out after 28 days ofcur ing in the air-conditioned room. The results of these experiments are set out in Table III.

TABLE III.—COMPLETE HARDENING OF COLD HARDENING

| Peroxide (amount 1.5%) | Accelerator | Dielectric loss factor, tg after 24 hr./20° C. | $10^3$ after 28 days/20° C. |
|---|---|---|---|
| Hardening of UP Resin 1 | | | |
| I | 0.2% A | 22.6 | 9.4 |
| I + V (50:50) | 0.2% A | 18.7 | 6.6 |
| I | 0.5% A | 13.1 | 8.1 |
| I + V (50:50) | 0.5% A | 10.8 | 6.6 |
| V | 0.5% A | 28.7 | 12.2 |
| I | 0.5% D | 28.9 | 10.0 |
| I + V (50:50) | 0.5% D | 18.6 | 7.1 |
| I | 0.5% E | 20.1 | 10.0 |
| I + V (50:50) | 0.5% E | 13.0 | 7.3 |
| I | 0.5% F | 18.2 | 10.6 |
| I + V (50:50) | 0.5% F | 15.2 | 6.7 |
| I | 0.5% G | 20.2 | 10.1 |
| I + V (50:50) | 0.5% G | 16.1 | 6.5 |
| II | 0.2% A | 17.7 | 9.5 |
| II + V (50:50) | 0.2% A | 13.6 | 6.5 |
| IV | 0.2% A | 21.9 | 11.8 |
| IV + V (50:50) | 0.2% A | 19.4 | 10.0 |
| Hardening of UP Resin 2 | | | |
| I | 0.5% D | 15.3 | 7.9 |
| I + V (50:50) | 0.5% D | 7.6 | 6.3 |
| I | 0.5% F | 11.0 | 7.5 |
| I + V (50:50) | 0.5% F | 7.4 | 5.3 |

EXAMPLE 4

In order to determine the rate of activity in the thermosetting of UP resins by the method of the invention, 30 grams of Resin 1 were stirred together in each case with the quantities of peroxide and accelerator as set out in Table IV. The resin was then placed in glass test tubes of 30 mm. diameter, and the tubes were placed in a thermostatically controlled water bath, having a bath temperature as given in the first column of the table. The recording of the setting process was accomplished by means of a precisely centered thermocouple connected to an automatically driven pen recorder. The factor $T_{gel}$ represents the time it takes for the mixture to assume a temperature 5° C. above the bath temperaure, and $T_{max}$ is the time it takes to reach the exothermic temperature peak. The details are shown in the following Table IV.

TABLE IV.—THERMOSETTING OF UP RESIN 1 WITH AND WITHOUT ACCELERATOR J

| Temperature | Peroxide | Accelerator, percent | Setting time | |
|---|---|---|---|---|
| | | | $T_{gel}$ | $T_{max}$ |
| 80° C | 1% I | 0.5 | 9' | 12' |
| | 1% VI | 0.5 | 12' | 18' |
| | 1% I (50:50) | 0.5 | 10' | 14' |
| | 1% II | 0.5 | 17' | 19' |
| | 1% V | 0.5 | 13' | 17' |
| | 1% II + V (50:50) | 0.5 | 13' | 19' |
| 100° C | 1% II | | 7' 30" | 10' |
| | 1% V | | 8' 30" | 13' |
| | 1% II + V (50:50) | | 7' 30" | 11' |

EXAMPLE 5

The complete curing or hardening of Resin 2, when the thermosetting was carried out at 80° C. for 3 hours, was measured on thermoset cast sheets 4 mm. thick, which had been set in a water bath at the temperature as given in Table V. The dielectric loss factor was measured following cooling, stripping and 24-hour storage of the sheet in an air-conditioned room (20° C., 60% rel. hum) using the same procedure as in Example 4, at 800 Hz. The results are shown in Table V.

TABLE V

Curing in the case of the thermosetting of up resin 2

(Curing conditions: 3 hr./80° C. followed by 4 hr./100° C.)

| Peroxide (amount 1.5%) | Dielectric loss factor tan $\delta.10^3$ |
|---|---|
| I | 6.0 |
| I+V (50:50) | 5.6 |
| II | 5.8 |
| II+V (50:50) | 5.6 |
| V | * 10.0 |
| III | 5.8 |
| III+VI (50:50) | 5.8 |
| IV | 6.1 |
| IV+VI (50:50) | 5.8 |

* Cured for 4 hrs. at 80° C. followed by 4 hrs. at 100° C.

EXAMPLE 6

The weathering properties of cast sheets prepared by the process of the invention were evaluated using sheets having a thickness of 4 mm. were cast between glass plates. The phototransmission of the sheets was determined using as a criteria the discoloration due to weathering. The measurements were performed with an Elrepho electrical transmission photometer at 460 nm. (No. 6 filter) and 420 nm. (No. 7 filter). These wavelength ranges correspond to an absorption of light in the blue-green range; a high absorption (corresponding to a low transmittance) signifies considerable discoloration towards the yellowish range. The standard or control readings (readings without the specimen) were:

Filter 6: 80%
Filter 7: 80.8%

The measurement of the phototransmission was carried out before and after 1000 hours of weathering in the "Xeno-test" apparatus manufactured by Quarzlampen Hanau.

The details of the experiments and results of these procedures are set out in Table VI.

TABLE VI.—DISCOLORATION OF CAST SHEETS BY WEATHERING (1) Thermosetting of UP Resin 1 (3 hrs. at 80° C. followed by 4 hrs. at 100° C.)

| | Phototransmission (in percent) | | | |
|---|---|---|---|---|
| | Before weathering | | After 1,000 hr. weathering | |
| Peroxide (amount 1.5%) | No. 6 filter | No. 7 filter | No. 6 filter | No. 7 filter |
| I | 68.8 | 62.9 | 44.7 | 27.4 |
| I plus V (50_50) | 69.1 | 65.7 | 52.7 | 38.5 |
| II | 68.1 | 64.0 | 49.9 | 36.8 |
| II plus V (50:50) | 69.1 | 65.5 | 52.7 | 38.0 |
| III | 66.8 | 61.7 | 42.2 | 27.1 |
| III and VI (50:50) | 67.9 | 63.0 | 48.5 | 33.7 |
| IV | 61.8 | 57.5 | 45.0 | 33.1 |
| IV plus VI (50:50) | 65.2 | 63.9 | 50.9 | 37.4 |
| V | 68.1 | 65.4 | 46.1 | 29.1 |

(2) Thermosetting of the self-quenching basin at 40° C. (with accelerator)

| | | | | |
|---|---|---|---|---|
| I plus 0.5% D | 59.0 | 44.8 | 41.3 | 25.1 |
| I plus V (50:50) plus 0.5% D | 57.3 | 40.1 | 51.1 | 31.8 |
| I plus 0.5% E | 56.2 | 39.2 | 55.4 | 38.8 |
| I plus V (50:50) plus 0.5% E | 58.3 | 41.0 | 56.9 | 40.1 |
| I plus 0.5% F | 57.7 | 42.5 | 39.6 | 27.5 |
| I plus V (50:50) plus 0.5% F | 53.5 | 36.6 | 44.4 | 30.8 |

The cast sheets as set out under (1) were set for 3 hours at 80° C. in a water bath and then post-cured for 8 hours at 100° C.

The cast sheets under (2) were set for 1 hour at 40° C. and after 24 hrs. at 20° C. they were post-cured for 6 hours at 70° C.

What is claimed is:

1. Process for setting unsaturated polyester resins which process comprises contacting a mixture of a vinyl monomer and an unsaturated polyester with a mixture consisting essentially of a perester and a tertiary hydroperoxide, the weight ratio of perester to tertiary hydroperoxide being from 90:10 to 10:90, wherein said unsaturated polyester is obtained by reaction of an unsaturated dicarboxylic acid, its anhydride or polyester-forming derivative thereof with a saturated or unsaturated polyol or polyester-forming derivative thereof.

2. Process as claimed in claim 1 wherein the weight ratio of perester to tertiary hydroperoxide is from 30:70 to 50:50.

3. Process according to claim 1 which comprises including an accelerator in said mixture.

4. Process according to claim 3 wherein said accelerator is a member selected from the group consisting of vanadium and cobalt metal salts.

5. Process according to claim 3 wherein said accelerator is a vanadium metal salt in admixture with a derivative of phosphorous acid.

6. Process according to claim 1 wherein said unsaturated polyester is obtained by reaction of an unsaturated dicarboxylic acid or anhydride thereof with a saturated or unsaturated polyol.

7. Process according to claim 1 wherein said setting agent is used in an amount of from 0.5 to 5%.

References Cited

UNITED STATES PATENTS 3,432,458  3/1969  Kwan et al. _____ 260—33.4
3,636,137  1/1972  Gerritsen et al. _____ 260—861

OTHER REFERENCES

Chem. Abstracts 73, 4522b (1970), published July 13, 1970.

HAROLD D. ANDERSON, Primary Examiner

E. A. NIELSEN, Assistant Examiner

U.S. Cl. X.R.

252—426; 260—863